UNITED STATES PATENT OFFICE.

RICHARD GUENTHER, OF OSHKOSH, WISCONSIN.

IMPROVEMENT IN WASHING-COMPOUNDS.

Specification forming part of Letters Patent No. 132,154, dated October 15, 1872.

*To all whom it may concern:*

Be it known that I, RICHARD GUENTHER, of Oshkosh, in the county of Winnebago and State of Wisconsin, have invented a certain Compound called "American Washing-Compound," to be used instead of soap for ordinary washing purposes, of which the following is a specification:

The nature of this invention consists in mixing a solution of common potato-starch with a solution of silicate of potassa or silicate of soda and inspissating to a certain density, perfuming this with nitro-benzole. To prepare the same, take a quantity of common potato-starch—say about four pounds—and rub it up to a fine powder. Mix the powder with about two hundred and fifty pounds of cold soft water and boil it, constantly stirring till it becomes gelatinous. Then add twenty-eight pounds of a solution of silicate of potassa or silicate of soda, made with soft water of 1.40 specific gravity. Evaporate to the proper consistency, yielding about sixty pounds. After cooling add ninety drops of nitro-benzole.

This compound answers all the purposes of ordinary soaps; is more economical, containing no excess of alkali, as all common soaps do. It is not detrimental to the fiber. It is a disinfectant. As it does not produce any foam, it is preferable in some cases, especially with washing-machines, where the abundant production of foam by ordinary soaps is a great objection. It operates in hard water better than any soap.

Having described my invention, what I claim as new, and for which I desire to secure Letters Patent, is—

As an article of manufacture, a washing-compound composed of potato-starch, soft water, a solution of silicate of potassa or silicate of soda, and nitro-benzole, in about the proportions and for the purpose specified.

RICHARD GUENTHER.

Witnesses:
   WORTHIE H. PATTON,
   JOHN W. GOE, M. D.